Dec. 8, 1964 R. M. CHUTE 3,160,827

VARIABLE BANDWIDTH AMPLIFIERS

Filed July 24, 1959 2 Sheets-Sheet 1

INVENTOR
ROBERT M. CHUTE
BY H. Vincent Harsha
ATTORNEY

Dec. 8, 1964 R. M. CHUTE 3,160,827
VARIABLE BANDWIDTH AMPLIFIERS
Filed July 24, 1959 2 Sheets-Sheet 2

INVENTOR
ROBERT M. CHUTE
BY H. Vincent Harsha
ATTORNEY

United States Patent Office 3,160,827
Patented Dec. 8, 1964

3,160,827

VARIABLE BANDWIDTH AMPLIFIERS

Robert M. Chute, Sudbury, Mass., assignor to Raytheon Company, Lexington, Mass., a corporation of Delaware Filed July 24, 1959, Ser. No. 829,454
2 Claims. (Cl. 330—167)

This invention relates generally to amplifiers for use in radio or radar receivers and, more particularly, to variable bandwidth amplifiers having a constant noise output.

In radar systems, it is desirable in some applications to provide a receiver amplifier, the bandwidth of which is capable of being varied over relatively wide limits. In more conventional variable bandwidth amplifiers, however, changes in bandwidth produce undesirable changes in receiver noise output as well as undesirable shifts in the center frequency of the system. Moreover, conventional variable bandwidth systems do not provide response characteristics which are reasonably independent of changes in tubes or other elements which make up the circuit.

One type of variable bandwidth amplifier that has been used in the past utilizes double tuned circuits. In these circuits, the bandwidth is varied by physically changing the relative positions of the primary and secondary windings that are used. Such positioning requires mechanical motion which must be provided by additional mechanical equipment. Such a system is especially impractical in applications where it is desirable to provide bandwidth control from a point remotely located from the amplifier itself, such as in equipment used in the field. Moreover, double tuned circuits known in the art bring about a shift in the center frequency of the system as the bandwidth is changed.

Other prior art systems using feedback and negative input loading have been found to cause center frequency shifts when the bandwidth is varied. Moreover, the response characteristics of such systems usually vary when tubes or other circuit elements are changed.

The circuit of the invention overcomes these disadvantages by providing a variable bandwidth amplifier in which the noise output and the center frequency remain constant as the bandwidth is changed. The response characteristics of the circuit remain reasonably independent of changes in circuit elements and the circuit is readily adaptable to control and calibration from a remote location.

In a specific embodiment of the circuit of the invention, there is provided a pair of pentodes coupled by a single tuned circuit. The tubes are chosen so that the transconductance of the first tube is made equal to the square root of the transconductance of the second tube. A variable D.-C. bias circuit is connected both to the cathode circuit of the first stage and through the tuned circuit to the cathode of the second stage. A variation in this bias voltage provides a variation in the bandwidth of the overall circuit. If the above relationship between the transconductances of the first and second pentode stages is maintained, the noise output and center frequency are held constant even if the bandwidth is varied over a relatively wide range.

The operation of the circuit of the invention is best explained with the help of the accompanying drawing wherein.

Figure 1:
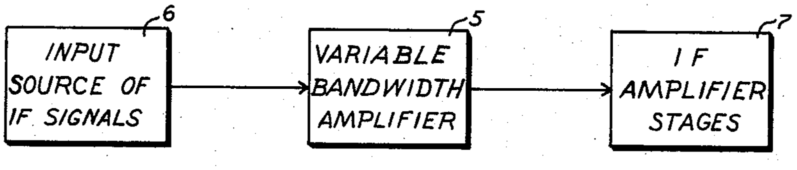
FIG. 1 shows a block diagram of an intermediate frequency system utilizing the circuit of the invention.

In the block diagram of FIG. 1, one particular embodiment of the invention is used in the IF stages of a radar receiver. In such receiver systems, variable bandwidth amplifier 5 is connected at its input to a source 6 of IF signals and is connected at its output to subsequent IF amplifier stages represented by block 7. In this way, the bandwidth of the receiver may be varied while the noise at the output of variable bandwidth amplifier 5 remains constant.

Figure 2:
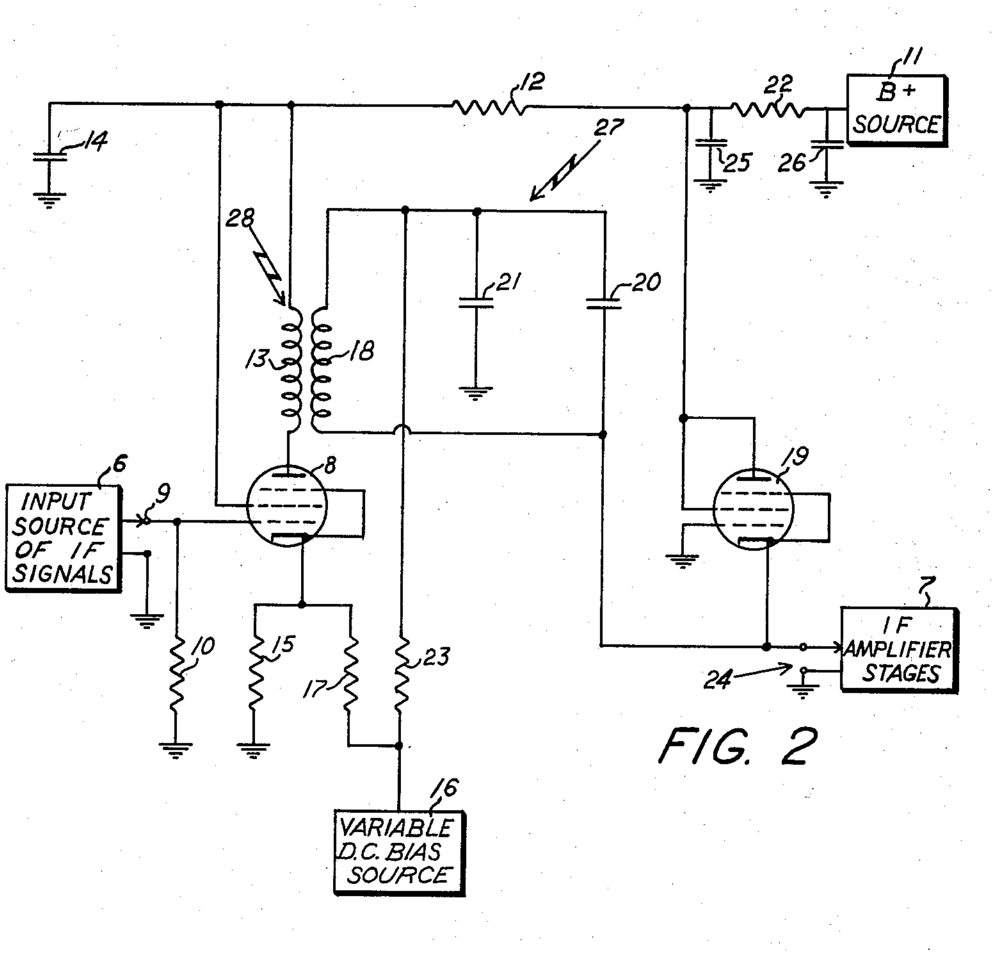
FIG. 2 shows a schematic diagram of one embodiment of the variable bandwidth amplifier circuit of the invention.

FIG. 2 shows a specific circuit that may be utilized for the variable bandwidth amplifier 5 of FIG. 1. In the circuit of FIG. 2, a first pentode 8 has its control grid connected to an input terminal 9 wherein there is provided an IF signal from a source 6. An input resistor 10 is connected from terminal 9 to ground. The screen grid of pentode 8 is connected to a source 11 of B+ voltage through resistors 12 and 22. The suppressor grid of pentode 8 is connected to the cathode. The plate of pentode 8 is connected to one side of a winding 13 of a bifilar coil 28, the other side of which is connected to B+ through resistors 12 and 22. Decoupling capacitor 14 is connected from the common junction point of winding 13 and the screen grid of pentode 8 to ground.

A cathode resistor 15 is connected from the cathode of pentode 8 to ground. The cathode of pentode 8 is also connected to a source of variable D.-C. bias voltage 16 through bias resistor 17. A second winding 18 of bifilar coil 28 is coupled to winding 13 at the output plate circuit of pentode 8. One side of winding 18 is connected to variable D.-C. bias source 16 and the other side of winding 18 is connected to the cathode of a second pentode 19. A capacitor 20 is connected across winding 18. The side of winding 18 which is not connected to the cathode of pentode 19 is connected to ground through a decoupling capacitor 21. Windings 13 and 18 and capacitor 20 make up a tuned circuit 27 coupling the plate circuit of pentode 8 with the cathode of pentode 19. Bifilar winding 28 provides unity coupling between the first pentode stage and the second pentode stage.

The control grid of pentode 19 is connected to ground and the screen grid of that same pentode is connected to B+ source 11 through resistor 22. The plate of pentode 19 is connected to the screen grid and, hence, receives its B+ voltage through resistor 22. The suppressor grid of pentode 19 is connected to the cathode. The output of pentode 19 is taken from the cathode to ground at output terminals 24. Decoupling capacitors 25 and 26 are connected from each side of resistor 22 to ground. In the circuit of the invention shown in FIG. 2, the bandwidth BW of tuned circuit 27 may be expressed as a function of the transconductance of pentode tube 19 and of the capacitance C of tuned circuit 27 in accordance with the following equation:

$$BW = \frac{g_{m2}}{2\pi C} \qquad (1)$$

where C is the capacitance of condenser 20 and $g_{m2}$ is the transconductance of tube 19.

If unity coupling exists between pentode stage 8 and pentode stage 19, the overall gain may be expressed as a function of the transconductances of pentodes 8 and 19 as follows:

$$\text{Gain} = \frac{g_{m1}}{g_{m2}} \quad (2)$$

where $g_{m1}$ is the transconductance of tube 8.

The output noise voltage $e_{out}$ may be expressed as:

$$e_{out} = (e_{in})(\text{Gain})(\sqrt{BW}) \quad (3)$$

where $e_{in}$ is the input noise voltage. Because the average value of the input noise voltage remains substantially constant, the output noise voltage may be held constant if the product of the gain and the square root of the bandwidth BW is maintained constant in accordance with the following equation:

$$(\text{Gain})(\sqrt{BW}) \quad (4)$$

Substitution of Equations 1 and 2 into Equation 4 yields:

$$\frac{g_{m1}}{g_{m2}} = \frac{k}{\sqrt{\frac{g_{m2}}{2\pi C}}} \quad (5)$$

The values of $k$ and C are chosen so that the following relationship exists:

$$k\sqrt{2\pi C} = 1 \quad (6)$$

If $k$ and C are properly chosen in accordance with Equation 6, then Equation 5 can be rewritten:

$$g_{m1} = \sqrt{g_{m2}} \quad (7)$$

As long as the relationship of Equation 7 holds, the output noise voltage will be constant even though the bandwidth is varied. Thus, the transconductances of pentodes 8 and 19 are chosen to satisfy the required relationship expressed by Equation 7. For example, in a remote cutoff tube, the relationship between the transconductance and the control grid voltage may be expressed approximately in accordance with the following expression:

$$\log g_m \approx \frac{E_g}{A} + B \quad (8)$$

where $E_g$ is the grid voltage, A is proportional to the slope of the pentode transconductance characteristic, and B is the intercept of the transconductance characteristic.

Equation 8 may be rewritten as:

$$g_m = 10^{\left(\frac{E_g}{A} + B\right)} \quad (9)$$

Thus, if $g_{m1}$ of tube 8 is selected in accordance with Equation 9, $g_{m2}$ of tube 19 is selected in accordance with the following equation:

$$g_{m2} = 10^{2\left(\frac{E_g}{A} + B\right)} \quad (10)$$

Tubes 8 and 19 are chosen as remote cutoff pentode tubes whose characteristics differ in slope and intercept. The use of cathode degeneration in pentode circuits allows the slopes and intercepts of the tube characteristics to be varied over reasonable limits of operation. Thus, in order to provide the relationships between the characteristics of tubes 8 and 19 expressed by Equation 7, the use of the cathode resistors 17 and 23 provides the cathode degeneration required for setting up the proper slope and intercepts for the tube characteristics involved. The values of resistors 17 and 23 are chosen to give the proper characteristics over the range of operation for which the tube is being used.

If the values of $k$ and C are chosen in accordance with Equation 6 and the tube characteristics are chosen in accordance with Equations 9 and 10 [thereby, providing a relationship between their transconductances as expressed by Equation 7], the circuit of the invention shown in FIG. 2 will provide a constant noise output over a wide range of bandwidth variations.

Figure 4:
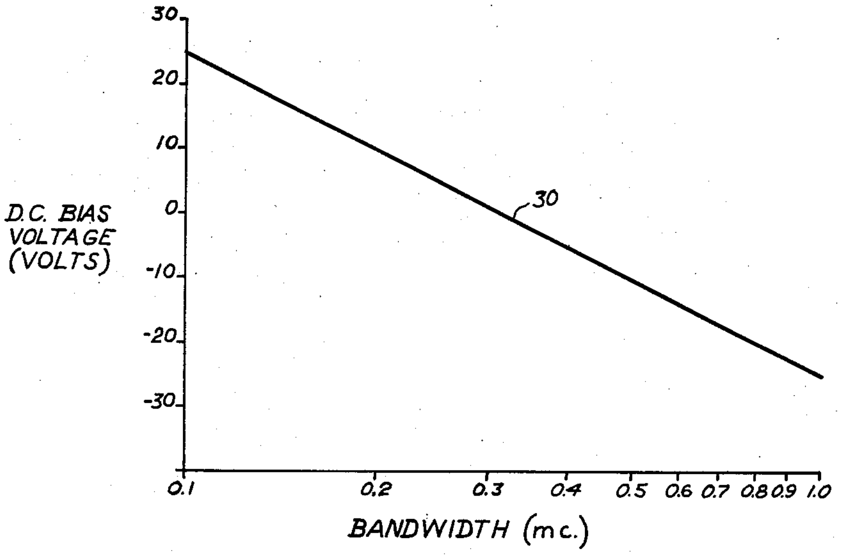
FIG. 4 shows a graph of the change in bandwidth as a function of the change in variable D.-C. bias applied to the first stage.

In the circuit, the bandwidth is varied by varying the bias voltage supplied by source 16. A curve 30 of desired bandwidth variation as a function of bias voltage is shown in FIG. 4. Experimental results have shown that the substitution of different tubes or other elements of the same type in the circuit does not cause the bandwidth values to differ by much from the desired curve shown in FIG. 4. Actual bandwidth values for a number of different tubes experimentally used have been found to correspond to curve 30 to within 10 percent tolerances in the worst case over most of the range and to within at least 20 percent tolerances over the total range. Thus, variations in curve 30, due to tube changes, are reasonably acceptable for substantially all applications.

Figure 3:
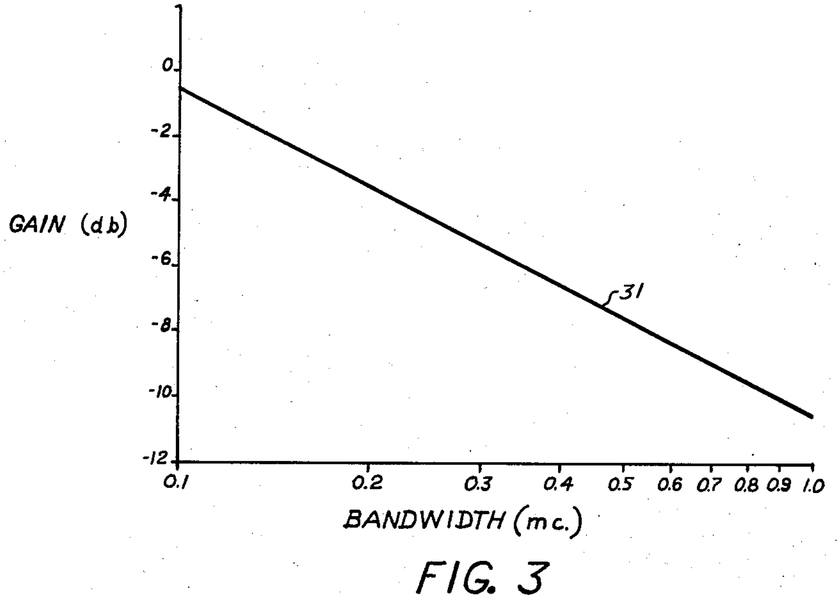
FIG. 3 shows a graph of the overall gain of the circuit of the invention as a function of the bandwidth.

FIG. 3 shows a desired curve 31 of gain as a function of bandwidth BW. Tube changes in the circuit of the invention do not seriously affect the desired curve shown in FIG. 3 and experimental results indicate that, even if a large number of different tubes are used in the circuit, there is less than $\pm 0.9$ db change from curve 31 over a range of bandwidth variations from 0.1 mc. to 1 mc. Moreover, over this range of bandwidth variations, the center frequency of the system is maintained essentially at a constant value.

The circuit of the invention can be easily adapted to remote control operation where control is provided from a console removed from the actual amplifier unit itself. All that is required on the console is a potentiometer which is used to vary the bias voltage and which can be easily calibrated in terms of the bandwidth range required. Calibrated settings of the potentiometer assure the reasonably accurate operation of the circuit. Moreover, additional mechanical equipment is not required as in prior art circuitry discussed previously.

Thus, the circuit of the invention provides a variable bandwidth amplifier which maintains a constant center frequency and noise output independent of bandwidth and which maintains a bandwidth-gain relationship which is reasonably independent of changes in tubes or other circuit elements.

This invention is not limited to the particular details shown and described herein as many equivalents will suggest themselves to those skilled in the art. It is accordingly desired that the appended claims be given a broad interpretation commensurate with the scope of the invention within the art.

What is claimed is:

1. A variable bandwidth amplifier comprising a first pentode stage having a cathode element, two grid elements, a plate element and a first transconductance; said first pentode stage having an input circuit connected to a source of input signals and an output circuit; a second pentode stage having a second transconductance, said second pentode stage having an input circuit and an output circuit, said first transconductance being substantially equal to the square root of said second transconductance, a reference potential connected to the common side of said first and second pentode stages; tuned circuit means coupling the output circuit of said first pentode stage to the input circuit of said second pentode stages; and variable direct current bias means coupled through impedance means to said tuned circuit means and to the cathode element of said first pentode stage for varying the bandwidth of said amplifier.

2. A variable bandwidth amplifier comprising a first remote cutoff pentode stage having a first transconductance; said first pentode stage having an input circuit connected to a source of input signals and an output circuit; a second remote cutoff pentode stage having a second transconductance, said second pentode stage having an input circuit and an output circuit, each of said pentode stages having a cathode element, two grid elements, and a plate element, said first transconductance being substantially equal to the square root of said second transconductance, a reference potential connected to the common side of said first and second pentode stages; tuned circuit means coupling the plate element of said first pentode stage to the cathode element of said second pentode stage by means of a bifilar coil having a primary winding, a secondary winding and a capacitor; variable direct current bias means coupled to the cathode of said first pentode stage and the secondary winding of said bifilar coil for varying the bandwidth of said amplifier.

References Cited in the file of this patent

UNITED STATES PATENTS

| | | |
|---|---|---|
| 2,577,746 | Faust et al. | Dec. 11, 1951 |
| 2,661,399 | Harvey | Dec. 1, 1953 |
| 2,680,788 | Hoxie | June 8, 1954 |

OTHER REFERENCES

Text—"Vacuum Tube Amplifiers," by Valley and Wallman, Radiation Lab. Series 18, 1948, chapters 12–14, on noise.

Proceedings of the I.R.E., publication—"A Low Noise Amplifier," by Wallman et al., June 1948, pages 700–708.

Proceedings of the I.E.R., publication—"Optimum Noise Performance of Linear Amplifiers," by Hans et al., August 1958, pages 1517–1533.